(No Model.)

L. MOSELEY.
COTTON PLANTER.

No. 435,317. Patented Aug. 26, 1890.

Witnesses:
E. P. Ellis,
B. Brockett,

Inventor:
L. Moseley,
per F. A. Lehmann, atty

UNITED STATES PATENT OFFICE.

LEEROY MOSELEY, OF COLLINSVILLE, MISSISSIPPI.

COTTON-PLANTER.

SPECIFICATION forming part of Letters Patent No. 435,317, dated August 26, 1890.

Application filed January 31, 1890. Serial No. 338,782. (No model.)

*To all whom it may concern:*

Be it known that I, LEEROY MOSELEY, of Collinsville, in the county of Lauderdale and State of Mississippi, have invented certain new and useful Improvements in Cotton-Planters; and I do hereby declare the following to be a full, clear, and exact description of the invention, such as will enable others skilled in the art to which it pertains to make and use it, reference being had to the accompanying drawings, which form part of this specification.

My invention relates to an improvement in cotton-planters; and it consists in the combination and arrangement of parts which will be more fully described hereinafter.

The object of my invention is to provide a cotton-planter with a vertically-adjustable furrow-opener to which is attached a pivoted arm, by means of which the depth to which the furrow is to be opened can be readily regulated, and behind which furrow-opener is placed a wheel which is operated by friction against the ground, and which runs in the furrow just in advance of the falling seed for the double purpose of operating the seed-cylinder and deepening the furrow.

Figure 1:
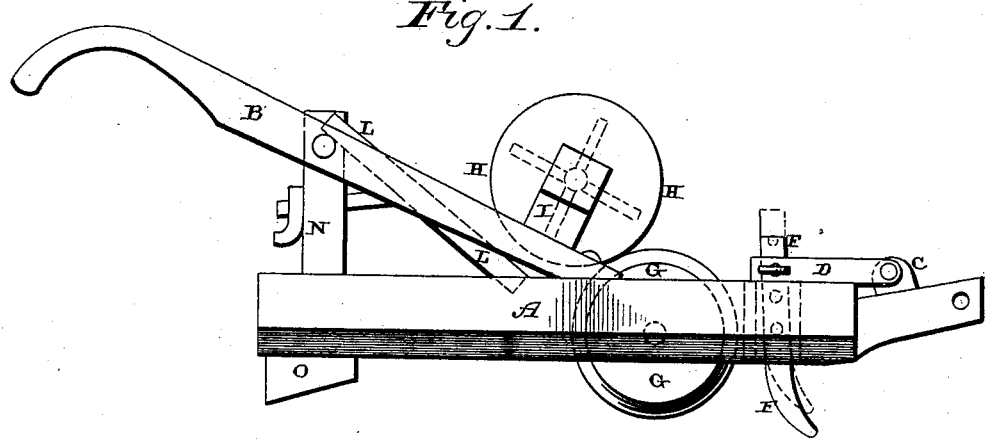
Figure 2:
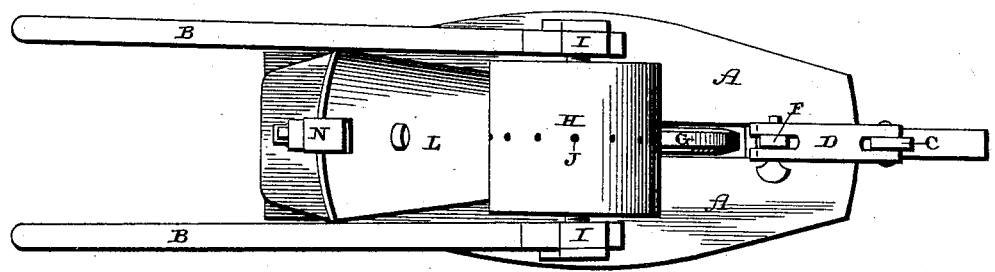

Figure 1 is a side elevation of a cotton-planter which embodies my invention. Fig. 2 is a plan view of the same.

A represents a frame of suitable shape to which the handles B are secured in the usual manner. Rising from the front end of the frame is a standard or projection C, to which the rearwardly-extending arm D is pivoted. Fastened to the rear end of this arm by a suitable bolt is the upper end of the vertically-adjustable standard F, which is provided with a series of perforations, so that the point at which the standard is fastened to this arm can be changed at the will of the operator, according to the depth that it is desired that the furrow shall be opened. This standard plays freely through the front end of the frame, and it is only necessary to change the fastening-bolt from one hole to another to regulate the depth at which the standard shall descend.

Journaled in the frame A in the rear of the furrow-opener is the wheel G, which runs in the furrow, and is operated by frictional contact against the ground. The upper edge of the wheel bears against the revolving seed-cylinder H, and causes the cylinder to revolve by frictional contact. The lower edge of the wheel runs in the furrow and serves to open it more thoroughly just in advance of the falling seed, and at the same time to revolve the seed-cylinder.

The cylinder H is journaled in the uprights I, which project above the front ends of the handles, and is provided with perforations J around its center, and through which the seed drop. Inside of this cylinder is placed a stirring device of any suitable description which keeps the seed from clogging as the cylinder revolves. In the rear of the cylinder is placed the inclined guide L, which is supported at its rear end by the standard N, which serves as a support for the handles, and at its front end by the frame just in the rear of the cylinder. As the seed fall from the cylinder this guide directs them to the opening in the frame, so that they drop into the furrow in the rear of the operating-wheel. In the rear end of the frame is secured a covering device O of any suitable construction, and which serves to cover the seed as the planter is moved forward.

Having thus described my invention, I claim—

In a planter, the combination of the frame, the furrow-opener placed at its front end, an operating-wheel journaled in the frame at the rear of the said opener, a revolving perforated hopper resting upon the said operating-wheel, supports in which the said hopper is journaled, and the incline which has its front end extending under and in front of the rear periphery of the hopper, and its rear end resting upon supports, whereby a compact and simple planter is produced, substantially as shown and described.

In testimony whereof I affix my signature in presence of two witnesses.

LEEROY MOSELEY.

Witnesses:
W. R. SUMMERLIN,
G. W. MCELROY.